United States Patent
Alfiad et al.

(10) Patent No.: US 10,122,460 B2
(45) Date of Patent: Nov. 6, 2018

(54) METHOD AND APPARATUS FOR AUTOMATIC COMPENSATION OF CHROMATIC DISPERSION

(71) Applicant: ADVA Optical Networking SE, Meiningen OT Dreissigacker (DE)

(72) Inventors: Mohammad Alfiad, Duluth, GA (US); Sorin Tibuleac, Johns Creek, GA (US); Cornelius Fuerst, Fuerstenfeldbruck (DE); Christophe Meyer, Meiningen (DE)

(73) Assignee: ADVA Optical Networking SE, Meiningen OT Dreissigacker (DE)

( * ) Notice: Subject to any disclaimer, the term of this patent is extended or adjusted under 35 U.S.C. 154(b) by 0 days.

(21) Appl. No.: 15/406,027

(22) Filed: Jan. 13, 2017

(65) Prior Publication Data

US 2018/0205461 A1 Jul. 19, 2018

(51) Int. Cl.
*H04J 14/02* (2006.01)
*H04B 10/2513* (2013.01)

(52) U.S. Cl.
CPC .......... *H04B 10/2513* (2013.01); *H04J 14/02* (2013.01)

(58) Field of Classification Search
CPC ...... H04B 10/2513; H04B 10/60; H04J 14/02
See application file for complete search history.

(56) References Cited

U.S. PATENT DOCUMENTS

| 4,551,019 A | 11/1985 | Vella et al. |
| 4,984,884 A | 1/1991 | Ryu et al. |

(Continued)

FOREIGN PATENT DOCUMENTS

| EP | 0 499 388 A2 | 8/1992 |
| EP | 1265062 A2 | 12/2002 |

(Continued)

OTHER PUBLICATIONS

Non-Final Office Action for U.S. Appl. No. 14/757,689 (dated Apr. 7, 2017).

(Continued)

*Primary Examiner* — Dzung Tran
(74) *Attorney, Agent, or Firm* — Jenkins, Wilson, Taylor & Hunt, P.A.

(57) ABSTRACT

A chromatic dispersion compensation apparatus for automatic compensation of chromatic dispersion of signals transmitted via an optical link at predetermined wavelengths of WDM channels within a predetermined band. A tapping unit taps optical signals received by the chromatic dispersion compensation apparatus via the optical link at predetermined wavelengths and supply them to an optical coherent receiver adapted to tune its local oscillator to WDM channels to generate corresponding analog electrical signals of the WDM channels which are sampled by an analog digital converter to provide digital signal samples of WDM channels processed by a digital signal processor of the chromatic dispersion compensation apparatus to calculate an estimate residual chromatic dispersion value of the received optical signals. A tuneable dispersion compensation module is set to perform optical compensation of a residual chromatic dispersion of the received optical signals depending on calculated estimate residual chromatic dispersion value of the received optical signals.

17 Claims, 8 Drawing Sheets

(56) References Cited

U.S. PATENT DOCUMENTS

| | | |
|---|---|---|
| 5,406,368 A | 4/1995 | Horiuchi et al. |
| 5,463,461 A | 10/1995 | Horiuchi et al. |
| 5,717,510 A | 2/1998 | Ishikawa et al. |
| 6,055,082 A | 4/2000 | Chikuma |
| 6,081,360 A | 6/2000 | Ishikawa et al. |
| 6,229,631 B1 | 5/2001 | Sato et al. |
| 6,411,416 B1 | 6/2002 | Ooi et al. |
| 6,456,411 B1 | 9/2002 | Ishikawa et al. |
| 6,487,352 B1 | 11/2002 | Sobiski et al. |
| 6,580,542 B1 | 6/2003 | Song et al. |
| 6,658,210 B1 | 12/2003 | Fee |
| 6,778,782 B1 | 8/2004 | Watley et al. |
| 7,035,538 B2 | 4/2006 | Willner et al. |
| 7,450,856 B2 | 11/2008 | Yoshimoto et al. |
| 7,813,647 B2 | 10/2010 | Ohtani |
| 8,131,148 B2 | 3/2012 | Sun et al. |
| 8,433,192 B2 | 4/2013 | Frankel et al. |
| 8,750,726 B2 | 6/2014 | Geyer |
| 2001/0030787 A1 | 10/2001 | Tajima |
| 2001/0035996 A1 | 11/2001 | Havstad et al. |
| 2001/0050767 A1 | 12/2001 | Babin et al. |
| 2002/0003646 A1 | 1/2002 | Ishikawa |
| 2002/0018213 A1 | 2/2002 | Ibukuro et al. |
| 2002/0044273 A1 | 4/2002 | Kimura et al. |
| 2002/0158191 A1 | 10/2002 | Graves |
| 2003/0002112 A1 | 1/2003 | Hirano et al. |
| 2004/0105684 A1 | 6/2004 | Marutani et al. |
| 2004/0156038 A1 | 8/2004 | Cao |
| 2004/0190906 A1 | 9/2004 | Jain |
| 2005/0226613 A1 | 10/2005 | Raddatz |
| 2006/0038975 A1 | 2/2006 | Doerr |
| 2006/0110165 A1 | 5/2006 | Seguineau et al. |
| 2006/0188255 A1* | 8/2006 | Tian ............... H04B 10/25133 398/33 |
| 2010/0092185 A1 | 4/2010 | Nemoto |
| 2010/0128344 A1 | 5/2010 | Lichtman |
| 2010/0284701 A1 | 11/2010 | Lin et al. |
| 2010/0303459 A1 | 12/2010 | Yuki et al. |
| 2011/0123191 A1* | 5/2011 | Murakami ....... H04B 10/25133 398/29 |
| 2011/0229153 A1 | 9/2011 | Sekine |
| 2012/0230673 A1 | 9/2012 | Striegler et al. |
| 2012/0281981 A1* | 11/2012 | Le Taillandier De Gabory .......... G01M 11/338 398/29 |
| 2014/0023360 A1* | 1/2014 | Iizuka ............... H04B 10/2507 398/25 |
| 2016/0087747 A1 | 3/2016 | Way |
| 2016/0218812 A1* | 7/2016 | Okabe .................... H04B 10/60 |
| 2016/0285559 A1 | 9/2016 | Xie et al. |
| 2017/0187482 A1 | 6/2017 | Alfiad et al. |

FOREIGN PATENT DOCUMENTS

| | | |
|---|---|---|
| EP | 1 630 982 A1 | 3/2006 |
| JP | 2004-228925 A | 8/2004 |
| WO | WO 2008/147758 A1 | 12/2008 |

OTHER PUBLICATIONS

Extended European Search Report for European Patent Application No. 16170392 (dated May 10, 2017).

Diniz et al., "Hardware-Efficient Chromatic Dispersion Estimator based on Parallel Gardner Timing Error Detector," Proc. OFC Conference 2013, Paper OTh3C.6, pp. 1-3 (2013).

Hauske et al., "Frequency Domain Chromatic Dispersion Estimation," Proc. OFC Conference 2010, Paper JThAl 1, pp. 1-3 (2010).

Kuschnerov et al., "Adaptive Chromatic Dispersion Equalization for Non-Dispersion Managed Coherent Systems," Proc. OFC Conference 2009, Paper OMT1, pp. 1-3 (2009).

Yao et al., "Spectrum Superposition Based Chromatic Dispersion Estimation for Digital Coherent Receivers," in Proc. ECOC Conference 2014, Paper P3.17, pp. 1-3 (2014).

Commonly-assigned, co-pending U.S. Appl. No. 14/757,689 for "Wavelength division multiplexed telecommunication system with automatic compensation of chromatic dispersion," (Unpublished, filed Dec. 23, 2015).

Final Office Action for U.S. Appl. No. 14/757,689 (dated Nov. 30, 2017).

Hirano et al., "Dispersion accommodation scheme comparing relative bit-phase of two SSB signals generated from spectrally filtered CS-RZ signal," Electronic Letters, vol. 38, Issue 12, pp. 580-582 (Jun. 2002).

Gnauck et al., "Generation and Transmission of 21.4-Gbaud PDM 64-QAM Using a Novel High-Power DAC Driving and Single I/Q Modulator", Journal of Lightwave Technology, IEEE Service Center, New York, NY, US, vol. 30, No. 4, Feb. 1, 2012, pp. 532-536.

Partial European Search Report for European Application No. 17196816 (dated May 3, 2018).

Non-Final Office Action for U.S. Appl. No. 14/757,689 (dated May 24, 2018).

* cited by examiner

METHOD AND APPARATUS FOR AUTOMATIC COMPENSATION OF CHROMATIC DISPERSION

TECHNICAL FIELD

The disclosure herein relates to a method and apparatus for automatic compensation of chromatic dispersion of signals transmitted via an optical link at predetermined wavelengths of wavelength division multiplexed, WDM, channels within a wavelength band of a WDM system.

BACKGROUND

In wavelength division multiplexed (WDM) telecommunication networks, optical signals are transported via optical fibers at different wavelengths within a wavelength band. Optical transceivers connected to an optical link, OL, are provided to transmit and receive optical signals. High-speed optical transceivers can use multi-level modulation formats and direct-detection receivers to offer high capacity transmission with low cost, reduced power consumption and low latency of the WDM system. Such transceivers are more vulnerable to chromatic dispersion, CD, related penalties than common receivers using two-level amplitude modulation formats. Examples of such modulation formats being considered for transmission at high data rates are PAM4, DMT and PAM8. These modulation formats require compensation of chromatic dispersion, CD, within tens of ps/nm to minimize any impact of chromatic dispersion, CD. The system's performance can be determined by bit error rate, BER, Q factor, signal to noise ratio, SNR, or other performance metrics. In conventional systems, precise chromatic dispersion estimation and compensation is cumbersome and inefficient for receivers with low chromatic dispersion tolerances. The chromatic dispersion tolerance in the order of no more than ±100 ps/nm chromatic dispersion compensation must be performed very accurately for these systems taking into account even the chromatic dispersion, CD, contributions from optical system components such as arrayed-waveguide gratings (AWG), optical filters, and Er-doped fiber in optical amplifiers.

Accordingly, there is a need to provide method and apparatus for performing automatic compensation of chromatic dispersion very precisely and with minimum cost.

SUMMARY

The disclosure herein provides according to a first aspect a chromatic dispersion compensation apparatus for automatic compensation of chromatic dispersion of signals transmitted via an optical link at predetermined wavelengths of WDM channels within a predetermined band of a WDM system, the chromatic dispersion compensation apparatus comprising:

a tapping unit adapted to tap optical signals received by the chromatic dispersion compensation apparatus via the optical link at predetermined wavelengths and adapted to supply the tapped optical signals to an optical coherent receiver adapted to tune its local oscillator to selected WDM channels to generate corresponding analog electrical signals of the different WDM channels which are sampled by an analog digital converter, ADC, to provide digital signal samples of the selected WDM channels processed by a digital signal processor, DSP, of the chromatic dispersion compensation apparatus to calculate an estimate residual chromatic dispersion value of the received optical signals, wherein a tuneable dispersion compensation module, TDCM, of the chromatic dispersion compensation apparatus is set to perform an optical compensation of a residual chromatic dispersion of the received optical signals depending on the calculated estimate residual chromatic dispersion value of the received optical signals.

In a possible embodiment of the chromatic dispersion compensation apparatus according to the first aspect of the present disclosure, a bulk amount of the chromatic dispersion is compensated by a fixed dispersion compensation module, DCM.

In a possible embodiment of the chromatic dispersion compensation apparatus according to the first aspect of the present disclosure, the residual chromatic dispersion of the received optical signal is compensated in two compensation stages comprising a coarse compensation stage and a fine compensation stage.

In a possible embodiment of the chromatic dispersion compensation apparatus according to the first aspect of the present disclosure, in the coarse compensation stage, the digital signal processor is used to estimate a coarse value of the residual chromatic dispersion, wherein the coarse value is communicated to the tuneable dispersion compensation module, TDCM, which performs a compensation of the received optical signals depending on the estimated coarse value of the residual chromatic dispersion.

In a further possible embodiment of the chromatic dispersion compensation apparatus according to the first aspect of the present disclosure, in the fine compensation stage, an error vector magnitude, EVM, of the received optical signals is calculated and used as a metric for fine tuning of the chromatic dispersion setting of the tuneable dispersion compensation module, TDCM.

In a further possible embodiment of the chromatic dispersion compensation apparatus according to the first aspect of the present disclosure the estimate residual chromatic dispersion of the received optical signals calculated by the digital signal processor, DSP, is communicated to a setting processor adapted to set the tuneable dispersion compensation module, TDCM, according to the communicated estimate residual chromatic dispersion.

In a still further possible embodiment of the chromatic dispersion compensation apparatus according to the first aspect of the present disclosure the chromatic dispersion compensation apparatus further comprises a probe signal generation unit adapted to generate a probe signal having a fixed or tuneable wavelength, wherein the probe signal is supplied to the optical link and used for estimation of chromatic dispersion.

In a still further possible embodiment of the chromatic dispersion compensation apparatus according to the first aspect of the present disclosure the digital samples output by the analog digital converter, ADC, are stored in a memory and processed by the digital signal processor in an offline processing mode.

In a still further possible embodiment of the chromatic dispersion compensation apparatus according to the first aspect of the present disclosure the tuneable dispersion compensation module, TDCM, is collocated with the tapping unit, the optical coherent receiver, the digital signal processor, DSP, and the setting processor on a receiver line card at a receiver side of the optical link.

In a still further possible embodiment of the chromatic dispersion compensation apparatus according to the first aspect of the present disclosure the tuneable dispersion compensation module, TDCM, is located on a transmitter line card at a transmitter side of the optical link and receives the chromatic dispersion compensation setting from a setting processor located on a receiver side via an optical supervisory channel, OSC, through the optical link. The OSC connection between the transmit and receive nodes can alternatively be established through an external transmission link.

In a possible embodiment of the chromatic dispersion compensation apparatus according to the first aspect of the present disclosure the tapping unit comprises an optical splitter, an optical switch or an optical filter.

In a still further possible embodiment of the chromatic dispersion compensation apparatus according to the first aspect of the present disclosure the tapping unit is connected to an output of an optical preamplifier of a receiver line card.

In a still further possible alternative embodiment of the chromatic dispersion compensation apparatus according to the first aspect of the present disclosure the tapping unit is connected to an output of an optical demultiplexer connected to the output of an optical preamplifier of a receiver line card.

In a still further possible embodiment of the chromatic dispersion compensation apparatus according to the first aspect of the present disclosure the optical coherent receiver comprises a dual-polarization IQ coherent receiver.

In a further possible embodiment of the chromatic dispersion compensation apparatus according to the first aspect of the present disclosure the dual-polarization IQ coherent receiver comprises polarization beam splitters adapted to split apart polarization components of the tapped optical signals supplied to the dual-polarization IQ coherent receiver and the optical signal generated by the local oscillator of the dual-polarization IQ coherent receiver.

In a still further possible embodiment of the chromatic dispersion compensation apparatus according to the first aspect of the present disclosure the dual-polarization IQ coherent receiver comprises:

a first 90 degree hybrid circuit adapted to mix vertical polarization components received from the polarization beam splitters to provide a vertical in-phase component and a vertical quadrature component; and a second 90 degree hybrid circuit adapted to mix horizontal polarization components received from the polarization beam splitters to provide a horizontal in-phase component and a horizontal quadrature component.

In a still further possible embodiment of the chromatic dispersion compensation apparatus according to the first aspect of the present disclosure the dual-polarization IQ coherent receiver comprises photo detectors adapted to convert the in-phase components and the quadrature components provided by the 90 degree hybrids into electrical signals converted by an analog digital converter into digital signal samples supplied to the digital signal processor, DSP.

In a still further possible embodiment of the chromatic dispersion compensation apparatus according to the first aspect of the present disclosure the local oscillator of the optical coherent receiver comprises a tuneable laser diode.

The disclosure herein further provides according to a second aspect a method for automatic compensation of chromatic dispersion of signals transmitted via an optical link at predetermined wavelengths of WDM channels within a predetermined band of a WDM system, the method comprising steps of:

tapping optical signals received via the optical link at predetermined wavelengths and supplying the tap signals to an optical coherent receiver;

tuning a local oscillator of the optical coherent receiver to selected WDM channels to generate corresponding analog electrical signals of the different WDM channels;

sampling the analog electrical signals by an analog digital converter to provide digital signal samples of the different WDM channels;

processing the digital signal samples by a digital signal processor, DSP, to calculate a residual chromatic dispersion value of the received optical signals; and setting a tuneable dispersion compensation module, TDCM, to perform an optical compensation of a residual chromatic dispersion of the received optical signals depending on the calculated residual chromatic dispersion value of the received optical signals.

In a possible embodiment of the method for automatic compensation of chromatic dispersion according to the second aspect of the present disclosure, a bulk amount of the chromatic dispersion is compensated by a fixed dispersion compensation module, DCM.

In a possible embodiment of the method for automatic compensation of chromatic dispersion according to the second aspect of the present disclosure, the residual chromatic dispersion of the received optical signals is compensated in two compensation stages comprising a coarse compensation stage and a fine compensation stage.

In a possible embodiment of the method for automatic compensation of chromatic dispersion according to the second aspect of the present disclosure, in the coarse compensation stage, a dedicated digital signal processor, DSP, is used to estimate a coarse value of the residual chromatic dispersion, wherein the coarse value is communicated to the tuneable dispersion compensation module which performs a compensation of the received optical signals depending on the estimated coarse value of the residual chromatic dispersion.

In a possible embodiment of the method for automatic compensation of chromatic dispersion according to the second aspect of the present disclosure, in the fine compensation stage, an error vector magnitude, EVM, of the received optical signals is calculated and used as a metric for fine tuning of the chromatic dispersion setting of the tuneable dispersion compensation module, TDCM.

In a further possible embodiment of the method for automatic compensation of chromatic dispersion according to the second aspect of the present disclosure a probe signal is generated and used for estimation of chromatic dispersion.

In a still further possible embodiment of the method for automatic compensation of chromatic dispersion according to the second aspect of the present disclosure, at least one signal of a WDM channel is used for estimation of chromatic dispersion. Use of multiple WDM channels for chromatic dispersion measurement provides information about the chromatic dispersion slope of the transmission fiber, and about the spectral variations in chromatic dispersion induced by optical components in the WDM signal path. This information can be used to improve the measurement accuracy of average CD across the desired spectral ranged used by the WDM signals, and, hence, for optimum setting of TDCM.

In a still further possible embodiment of the method for automatic compensation of chromatic dispersion according to the second aspect of the present disclosure the samples output by the analog digital converter, ADC, are stored in a memory and processed by the digital signal processor, DSP, offline.

In a further possible embodiment of the method for automatic compensation of chromatic dispersion according to the second aspect of the present disclosure, the optical compensation of the residual chromatic dispersion of the received optical signals is performed continuously in the background throughout a lifetime of the optical link. This allows dynamic compensation of chromatic dispersion as it varies over time due to changes in environmental factors (temperature, vibrations, stress, etc) or ageing effects of components and fiber infrastructure. As an example, dynamic compensation of chromatic dispersion would be beneficial in fiber links using aerial fiber cables subject to weather-induced chromatic dispersion variations.

BRIEF DESCRIPTION OF THE DRAWINGS

In the following, possible embodiments of the different aspects of the present disclosure are described in more detail with reference to the enclosed figures.

DETAILED DESCRIPTION

Figure 1:
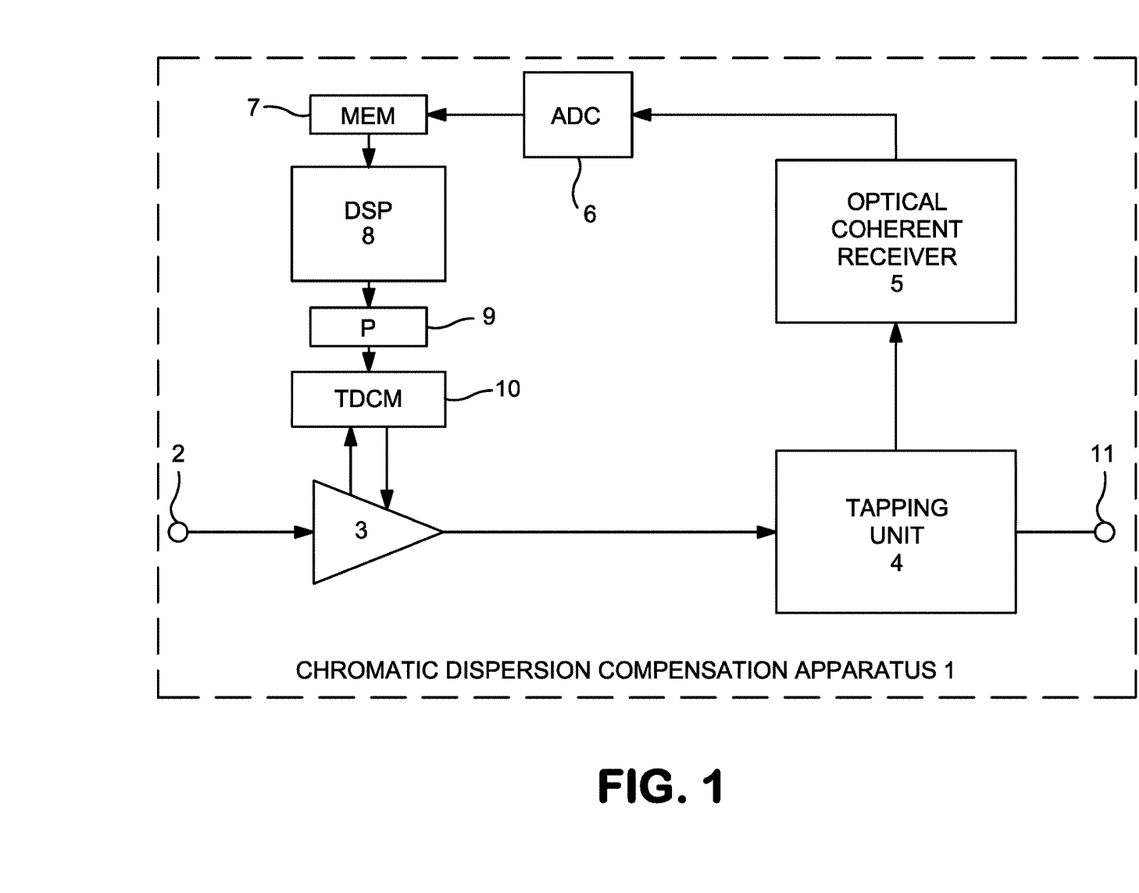
FIG. 1 shows a block diagram of a possible exemplary embodiment of a chromatic dispersion compensation apparatus according to the first aspect of the present disclosure.

FIG. 1 shows a block diagram of a possible exemplary embodiment of a chromatic dispersion compensation apparatus according to the first aspect of the present disclosure.

Figure 2:
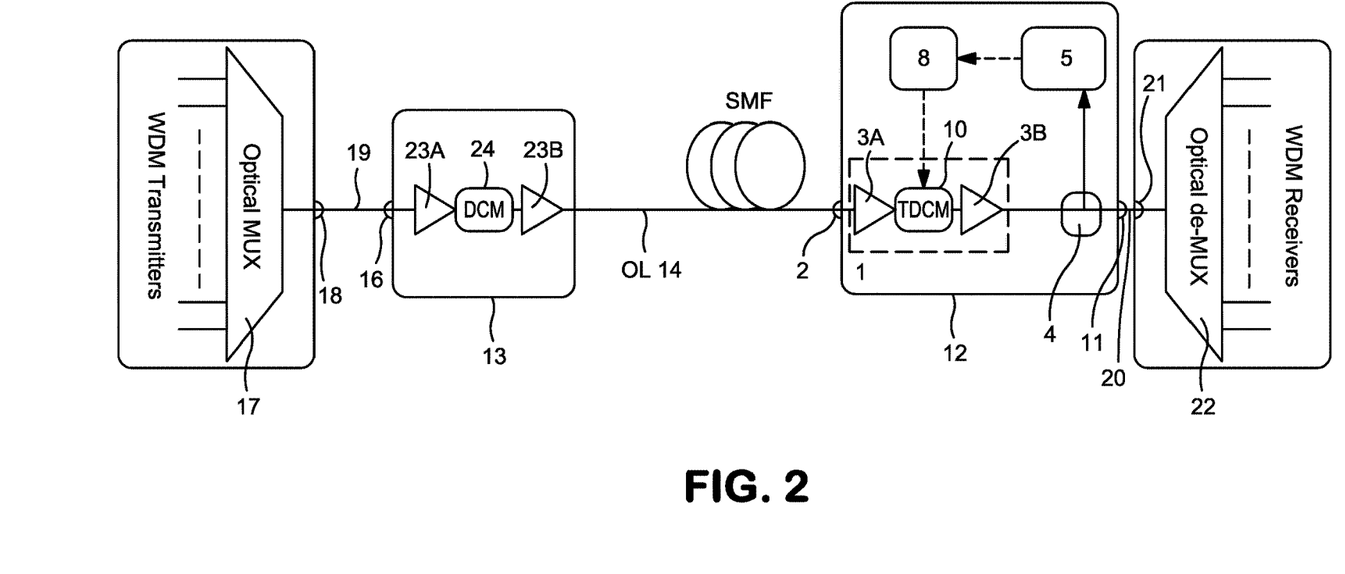
FIG. 2 shows a further possible embodiment of a chromatic dispersion compensation apparatus according to the first aspect of the present disclosure.

The chromatic dispersion compensation apparatus 1 comprises a signal input 2 adapted to receive optical signals transported through an optical link. The chromatic dispersion compensation apparatus 1 is preferably located on a receiver side of an optical transport system. The chromatic dispersion compensation apparatus 1 comprises in the illustrated exemplary embodiment a two stage signal amplifier 3 adapted to amplify the received optical signals and a tunable dispersion compensation unit (TDCM) 10. As illustrated in FIG. 2 the TDCM 10 is typically connected via fiber patchcords between the output of the first amplifier stage 3A of amplifier 3, and the input of the second amplifier stage 3B of signal amplifier 3. Alternatively, the TDCM 10 can also be placed at the output of signal amplifier 3. The amplified optical signals output by the signal amplifier 3 are supplied to a tapping unit 4 of the chromatic dispersion compensation apparatus 1. The chromatic dispersion compensation apparatus 1 is adapted to perform an automatic compensation of chromatic dispersion, CD, of signals transmitted via an optical link at predetermined wavelengths of WDM channels within a predetermined wavelength band of a WDM system. The optical signals transported through the optical link and received by the chromatic dispersion compensation apparatus 1 at its signal input 2 are amplified by the signal amplifier 3 and supplied via an internal signal line to the tapping unit 4 of the chromatic dispersion compensation apparatus 1. The tapping unit 4 is adapted to tap optical signals received by the chromatic dispersion compensation apparatus 1 via the optical link at predetermined wavelengths. The tapping unit 4 is further adapted to supply the tapped optical signals to an optical coherent receiver 5 as illustrated in FIG. 1. The optical coherent receiver 5 is configured to tune its local oscillator to selected WDM channels to generate corresponding analog electrical signals of the different WDM channels which can be sampled by an analog digital converter 6 of the chromatic dispersion compensation apparatus 1. The analog electrical signals applied to the analog digital converter 6 are sampled by the analog digital converter to provide digital signal samples of the selected WDM channels. In the illustrated embodiment of FIG. 1, the digital samples can be written to a local memory 7 of the chromatic dispersion compensation apparatus 1. A digital signal processor 8 of the chromatic dispersion compensation apparatus 1 has access to the local data memory 7 and reads out the digital signal samples of the selected WDM channels stored temporarily in the local data memory 7. The digital signal processor, DSP, of the chromatic dispersion compensation apparatus 1 is adapted to calculate an estimate residual chromatic dispersion, CD, value of the received optical signals. In the illustrated embodiment, the estimate residual chromatic dispersion value of the received optical signals as calculated by the digital signal processor, DSP, 8 is communicated to a setting processor 9 adapted to set a tuneable dispersion compensation module, TDCM, 10 of the chromatic dispersion compensation apparatus 1. The tuneable dispersion compensation module 10 is set by the setting processor 9 according to the estimate residual chromatic dispersion, CD, value communicated by the digital signal processor 8. In the embodiment shown in FIG. 1, the chromatic dispersion compensation apparatus 1 comprises a local data memory 7 for receiving the digital samples provided by the analog digital converter 6. In an alternative embodiment, the digital samples generated by the analog digital converter 6 are directly supplied to a digital signal processor 8. Further, in the illustrated embodiment of FIG. 1, the tuneable dispersion compensation module, TDCM, 10 is controlled by a setting processor. In an alternative embodiment, the tuneable dispersion compensation module 10 is directly controlled by the digital signal processor 8 comprising an integrated setting unit. The digital samples output by the analog digital converter 6 in the embodiment shown in FIG. 1 can be stored in the local memory 7 and processed by the digital signal processor 8 in an offline processing mode. The signals output by the signal amplifier 3 can travel through the tapping unit 4 to an output 11 of the chromatic dispersion compensation apparatus 1 for further processing.

In a possible embodiment of the chromatic dispersion compensation apparatus 1 as illustrated in FIG. 2, a bulk amount of the chromatic dispersion is compensated by a fixed dispersion compensation module, DCM. This fixed dispersion compensation module, DCM, can be located on a transmitter side or on a receiver side of the system.

The bulk chromatic dispersion can be determined prior to installation of the DWDM equipment, for instance based on field measurements on the optical transmission fiber link.

Based on the calculated amount of bulk compensation to be compensated by the fixed dispersion compensation module, DCM, the DCM module can be implemented and installed. The fixed dispersion compensation module, DCM, compensates a bulk amount of chromatic dispersion. However, a residual amount of chromatic dispersion after the bulk amount of the chromatic dispersion has been compensated by the fixed dispersion compensation module, DCM, can still be large compared to the range of chromatic dispersion which the receiver can tolerate, and is consequently compensated using the method and apparatus according to the present disclosure. In a possible embodiment, the residual chromatic dispersion, rCD, of the received optical signals is compensated in two compensation stages. The two compensation stages comprise a coarse compensation stage and a fine compensation stage. In the coarse compensation stage, a dedicated digital signal processor, DSP, can be used to estimate a coarse value of the residual chromatic dispersion which is then communicated to the tuneable dispersion compensation module, TDCM, which performs a compensation of the received optical signals depending on the estimated coarse value of the residual chromatic dispersion. The dedicated digital signal processor, DSP, for chromatic dispersion estimation can be employed and helps in a first step to compensate a major part of the residual chromatic dispersion. It is possible to use conventional DSP algorithms for coarse chromatic dispersion estimation as described in F. N. Hauske et al. "Frequency domain chromatic dispersion estimation" in Proc. OFC Conference 2010, Paper JThA11 or by M. Kuschnerov et al. "Adaptive chromatic dispersion equalization for non-dispersion managed coherent systems" in Proc. OFC Conference 2009, Paper OMT1 or as described by Shuchang Yao et al. "Spectrum superposition base chromatic dispersion estimation for digital coherent receivers" in Proc. ECOC Conference 2014, Paper P3.17. After a coarse value of the residual chromatic dispersion has been estimated and communicated to the tuneable dispersion compensation module, TDCM, for compensation, a fine compensation of the residual chromatic dispersion can be performed. In the fine compensation stage, an error vector magnitude, EVM, of the received optical signals can be calculated and used as a metric for fine tuning of the chromatic dispersion setting of the tuneable dispersion compensation module, TDCM. In a possible embodiment, the optical compensation of the residual chromatic dispersion of the received optical signals can be performed continuously in the background throughout a lifetime of the optical link. The EVM calculation can be kept running in the background throughout the lifetime of the optical link in order to take into account variations in the residual chromatic dispersion value, i.e. due to changes of environmental conditions.

In the embodiment illustrated in FIG. 1, the tuneable dispersion compensation module 10 is collocated with the tapping unit 4, the optical coherent receiver 5, the digital signal processor 8 and the setting processor 9 on a receiver line card at a receiver side of the optical link. In an alternative embodiment, the tuneable dispersion compensation module, TDCM, 10 can also be located on a transmitter line card at a transmitter side of the optical link wherein the tuneable dispersion compensation module, TDCM, 10 receives the chromatic dispersion compensation setting from a setting processor 9 located on a receiver side via an optical supervisory channel, OSC, through the optical link.

The tapping unit 4 illustrated in FIG. 1 can comprise an optical splitter, an optical switch or an optical filter. The tapping unit 4 is connected to an output of the optical preamplifier 3 as shown in FIG. 1. In an alternative embodiment, the tapping unit 4 can also be connected to an output of an optical demultiplexer connected to the output of the optical preamplifier 3 of a receiver line card.

Figure 6:
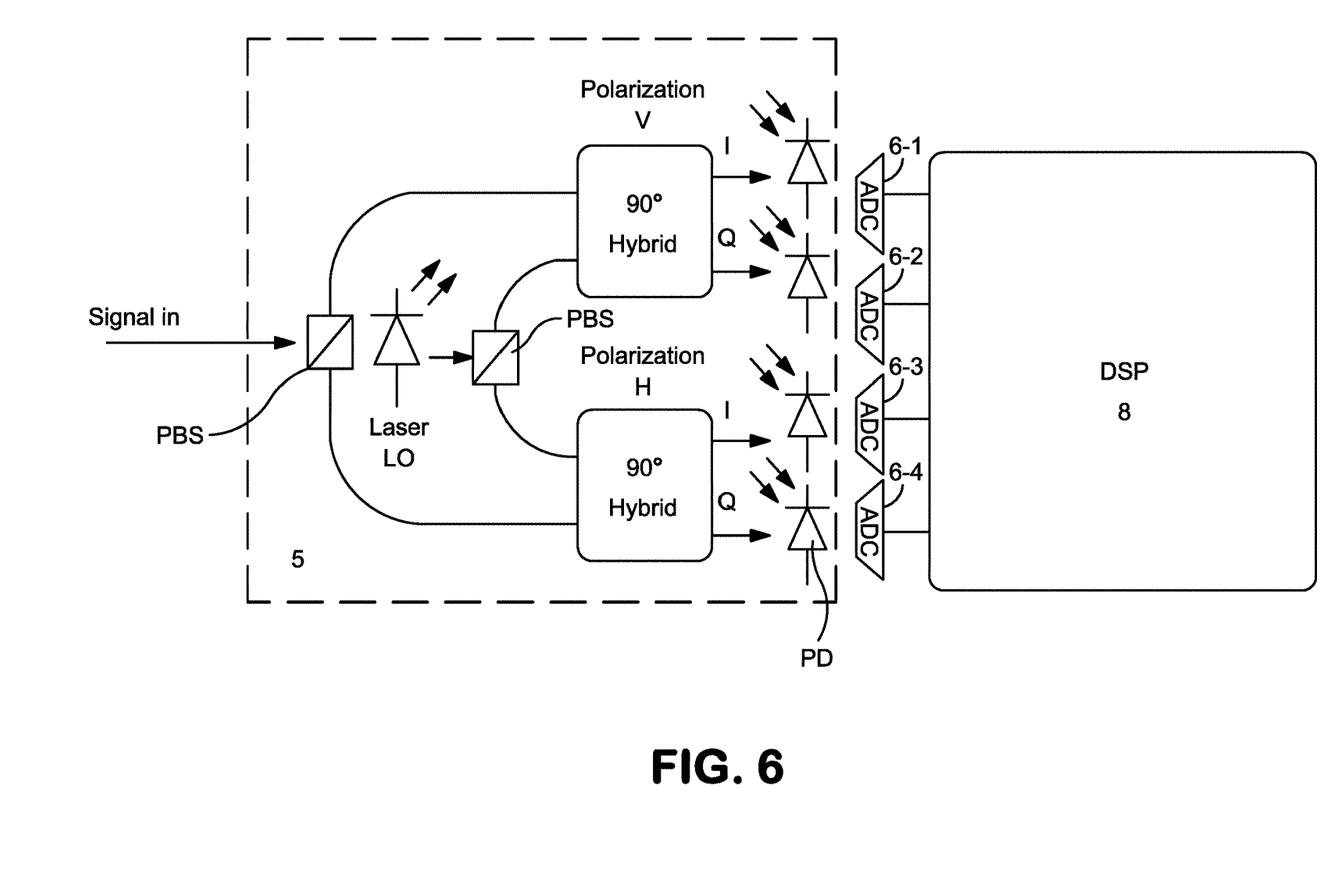
FIG. 6 shows a schematic diagram of an optical coherent receiver which can be used in a chromatic dispersion compensation apparatus according to the first aspect of the present disclosure.

The optical coherent receiver 5 comprises in a possible embodiment a dual-polarization IQ coherent receiver. In a possible implementation, an optical coherent receiver 5 is illustrated in FIG. 6. The chromatic dispersion compensation apparatus 1 as illustrated in the embodiment of FIG. 1 implements an automatic chromatic dispersion compensation entity which is adapted to operate simultaneously on all WDM channels. The chromatic dispersion compensation is placed as close as possible to an optical receiver in order to capture all chromatic dispersion contributions from all components or elements in the optical transmission system. Feedback on the residual chromatic dispersion in the optical signal is given to a chromatic dispersion compensation component from the coherent receiver 5 providing signals and data to a digital signal processor 8 which can run in a possible embodiment offline. The chromatic dispersion compensation itself is achieved by an optical tuneable dispersion compensation module TDCM, 10 which can operate on all wavelength division multiplexed, WDM, channels simultaneously. The TDCM can employ etalons, Fiber Bragg gratings, arrayed waveguide gratings, or other technologies for optical compensation of chromatic dispersion. In the illustrated embodiment, the chromatic dispersion estimation can be carried out by the coherent receiver 5 on the WDM channels without need for received probe signals. In a further possible embodiment, the chromatic dispersion estimation can be carried out also by taking into account probe signals transported through the optical link and received by the chromatic dispersion compensation apparatus 1. In this embodiment of the system, a probe signal generation unit can be provided on the transmitter side wherein the probe signal generation unit is adapted to generate at least one probe signal which is supplied through the optical link of the chromatic dispersion compensation apparatus 1 and used for accurate estimation of the chromatic dispersion, CD. The probe signal generation unit can be configured to generate a probe signal having a fixed or tuneable wavelength.

In a possible embodiment of the chromatic dispersion compensation apparatus 1, the residual chromatic dispersion, rCD, is continuously estimated and compensated throughout the lifetime of the optical link without disturbing the WDM signal transmission. In a possible embodiment, probe signal generation units can also be operated during a start-up phase of the optical system for automatic chromatic dispersion compensation. With the chromatic dispersion compensation apparatus 1 as shown in FIG. 1, it is possible to perform an automatic compensation of chromatic dispersion, CD, for all WDM channels simultaneously. Further, the chromatic dispersion compensation apparatus 1 takes into account the chromatic dispersion contributions from all components of the WDM transmission system when performing the automatic chromatic dispersion compensation. Further, the chromatic dispersion compensation apparatus 1 allows a very fast estimation and compensation of the chromatic dispersion, CD, without the need for a feedback on the performance of the WDM channels. A further advantage of the chromatic dispersion compensation apparatus 1 resides in that a seamless integration to one of the elements of a WDM transmission system is possible, in particular a seamless integration with multiplexers/demultiplexers or amplifiers. The chromatic dispersion compensation apparatus 1 can further take advantage of major high-volume optical components such as small-form factor coherent receivers used in pluggable modules as well as low-speed offline digital signal processors to reduce complexity and costs of the chromatic dispersion measurement and chromatic dispersion compensation. The chromatic dispersion compensation apparatus 1 has the ability to dynamically monitor and compensate for changes within the chromatic dispersion which may happen due to environmental changes without disturbing the wavelength division multiplexed, WDM, data traffic transported through the optical link, OL.

FIG. 2 illustrates a high-level block diagram of a proposed WDM system comprising a chromatic dispersion compensation apparatus 1 according to the first aspect of the present disclosure. In the illustrated embodiment, the chromatic dispersion compensation apparatus 1 can be integrated on a receiver line card 12 of the system. The system further comprises a transmitter line card 13 connected to the receiver line card 12 via an optical link 14 comprising one or more optical fibers. An output 15 of the transmitter line card 13 is connected via the optical link 14 to signal input 2 of the chromatic dispersion compensation apparatus 1. In the illustrated embodiment, the chromatic dispersion compensation apparatus 1 is integrated on the receiver line card 12 of the system. In the illustrated embodiment of FIG. 2, a signal input 16 of the transmitter line card 13 is connected to a signal output 18 of a separate card comprising an optical multiplexer 17. The signal output 18 is connected via an optical link 19 to the signal input 16 of the transmitter line card 13 as shown in FIG. 2. The optical multiplexer 17 comprises several signal inputs for connecting WDM transmitters as shown in FIG. 2. On the receiver side, a signal output 11 of the chromatic dispersion compensation apparatus 1 integrated on the receiver line card 12 is connected through a signal line 20 to the signal input 21 of a separate card. This card comprises an optical demultiplexer 22 having several outputs for connecting WDM receivers. As illustrated in FIG. 2, the WDM channels provided by the WDM transmitters can be multiplexed with one or more modulation formats at the transmitter side. In the illustrated embodiment, the transmitter line card 13 comprises a dual stage signal amplifier 23 and a fixed dispersion compensation module, DCM, 24. The fixed dispersion compensation module 24 is adapted to compensate a bulk amount of an estimated chromatic dispersion, CD and can be located between a first amplifier stage 23A and a second amplifier stage 23B of a two stage signal amplifier 23.

The fixed dispersion compensation module 24 compensates a bulk amount of the chromatic dispersion. The value of chromatic dispersion to be compensated by the DCM module 24 can be calculated based on field measurements on the optical link before installation of the WDM equipment and implemented in the DCM module 24. Alternatively, a fixed-value DCM can be implemented as a bias negative chromatic dispersion, allowing the TDCM 10 to minimize the residual chromatic dispersion by adding positive chromatic dispersion for short spans or negative chromatic dispersion for long spans.

The digital signal processor 8 of the chromatic dispersion compensation apparatus 1 can be integrated on the receiver line card 12 and perform offline processing of the signals using one of the well-established chromatic dispersion estimation algorithms and then communicate the estimated residual chromatic dispersion value to the tuneable dispersion compensation module, TDCM, 10 for optical chromatic dispersion compensation. In a possible embodiment, the digital signal processor, DSP, 8 can operate offline. For offline processing, the signals are first saved in certain memory locations and then processed at a lower speed. In the embodiment illustrated in FIG. 2, the tuneable dispersion compensation module, TDCM, 10 is collocated on the same receiver card 12 as the coherent receiver 5.

Figure 3:
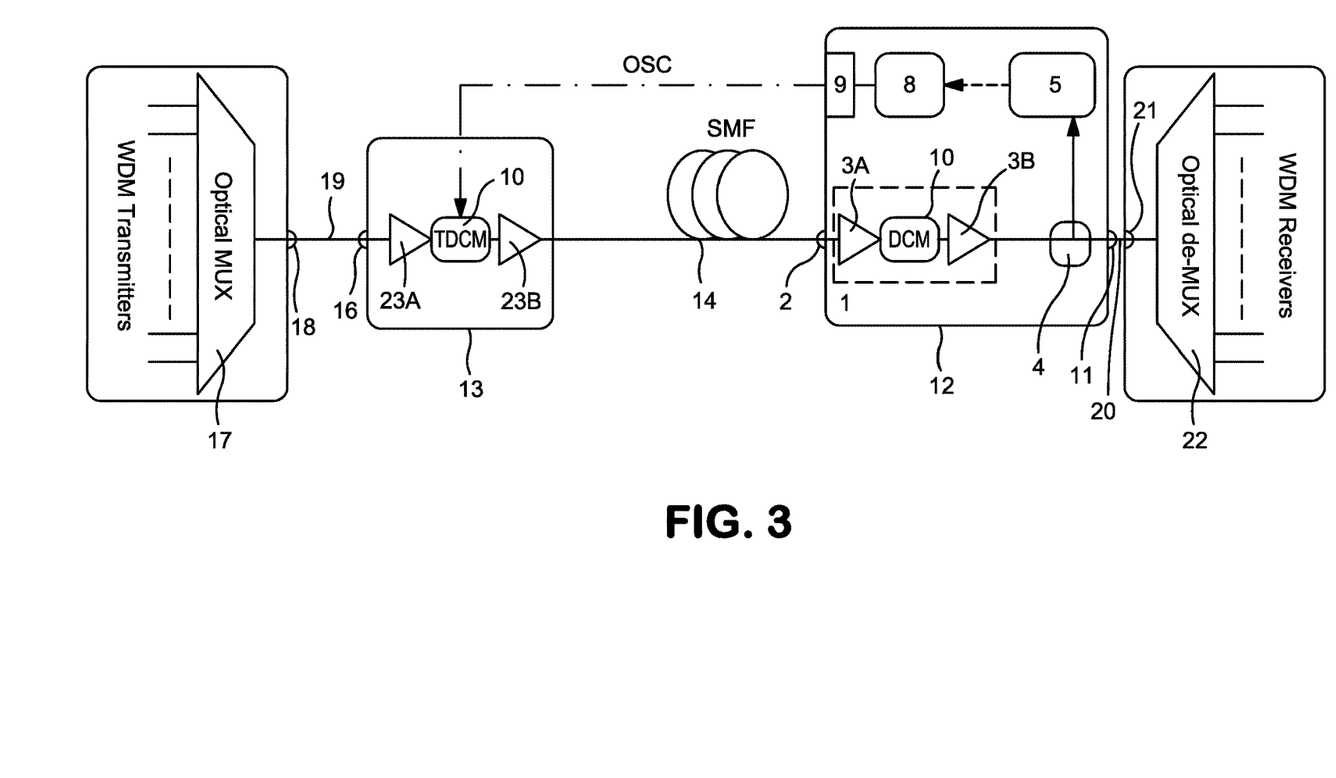
FIG. 3 shows a further possible exemplary embodiment of a chromatic dispersion compensation apparatus according to the first aspect of the present disclosure.

FIG. 3 shows a further possible exemplary embodiment of a chromatic dispersion compensation apparatus 1 according to the first aspect of the present disclosure. In the illustrated embodiment of FIG. 3, the tuneable dispersion compensation module, TDCM, 10 is not located on the receiver side but on the transmitter side. In the illustrated embodiment of FIG. 3, the tuneable dispersion compensation module, TDCM, 10 is located on a transmitter line card 13 which comprises a signal amplifier 23. In the illustrated embodiment, the transmitter line card 13 is a booster card comprising signal a boosting amplifier 23. In the illustrated embodiment of FIG. 3, the tuneable dispersion compensation module, TDCM, 10 is located on the transmitter line card 13 at the transmitter side of the optical link 14 and receives the chromatic dispersion compensation setting from a setting processor 9 located on the receiver side via an optical supervisory channel, OSC, through the optical link 14. In the exemplary embodiment, illustrated in FIG. 3, the fixed dispersion compensation module, DCM, 24 is located on the receiver side and located on the receiver line card 12. In a possible embodiment, the tuneable dispersion compensation module, TDCM, 10 and the fixed dispersion compensation module, DCM, 24 are located on different sides of the optical link 14. Both the booster amplifier 13 and the preamplifier 3 can be integrated together with the automatic chromatic dispersion compensation system into a single line card to facilitate the support of a bidirectional transmission link. An OSC transceiver and filter can be integrated on the same card as well which can be used to communicate messages between different components of the automatic chromatic compensation system on the two ends of the optical link 14.

Figure 4:
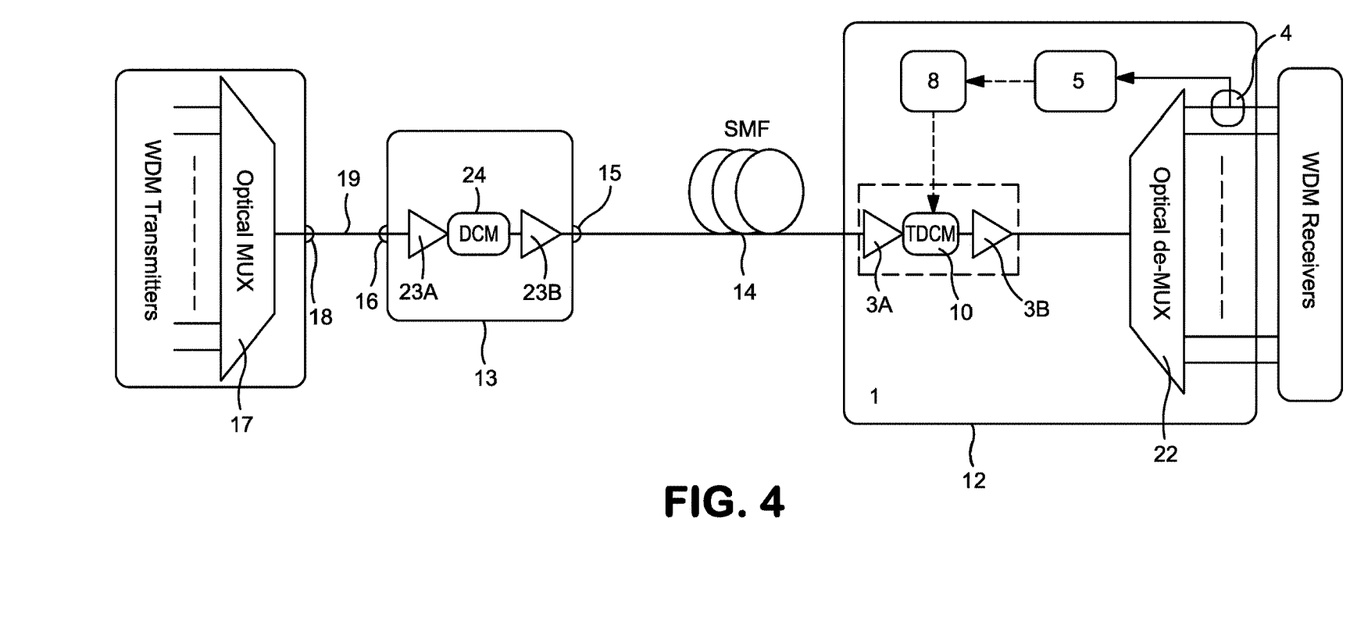
FIG. 4 shows a further possible embodiment of a chromatic dispersion compensation apparatus according to the first aspect of the present disclosure.

FIG. 4 illustrates a further possible exemplary embodiment of a chromatic dispersion compensation apparatus 1 according to the first aspect of the present disclosure. In the illustrated embodiment of FIG. 4, the tuneable dispersion compensation module, TDCM, 10 is located on the receiver side similar to the embodiment illustrated in FIG. 2. In contrast to the embodiment illustrated in FIG. 2, the tapping unit 4 is not located at the output of the two stage signal amplifier 3 but at the output of an optical demultiplexing unit 22 provided on the receiver line card 12. Accordingly, the tapping unit 4 is connected to an output of the optical demultiplexer 22 being connected to the optical preamplifier 3 of the receiver line card 12. In the embodiment illustrated in FIG. 4, a WDM channel can be tapped out from one of the outputs of the demultiplexer 22 for chromatic dispersion estimation. In the illustrated embodiment, the optical demultiplexer 22 can be integrated on the same card together with the two stage optical signal amplifier 3 of the coherent receiver 5 and the chromatic dispersion compensation module comprising the offline DSP 8, the setting processor 9 and the TDCM 10. In an alternative implementation, signals for chromatic dispersion estimation and/or chromatic dispersion compensation can be tapped out of an external optical demultiplexer and fed back to the receiver line card 12 that contains the optical amplifier 3, the coherent receiver 5 and the chromatic dispersion compensation module.

Figure 5:
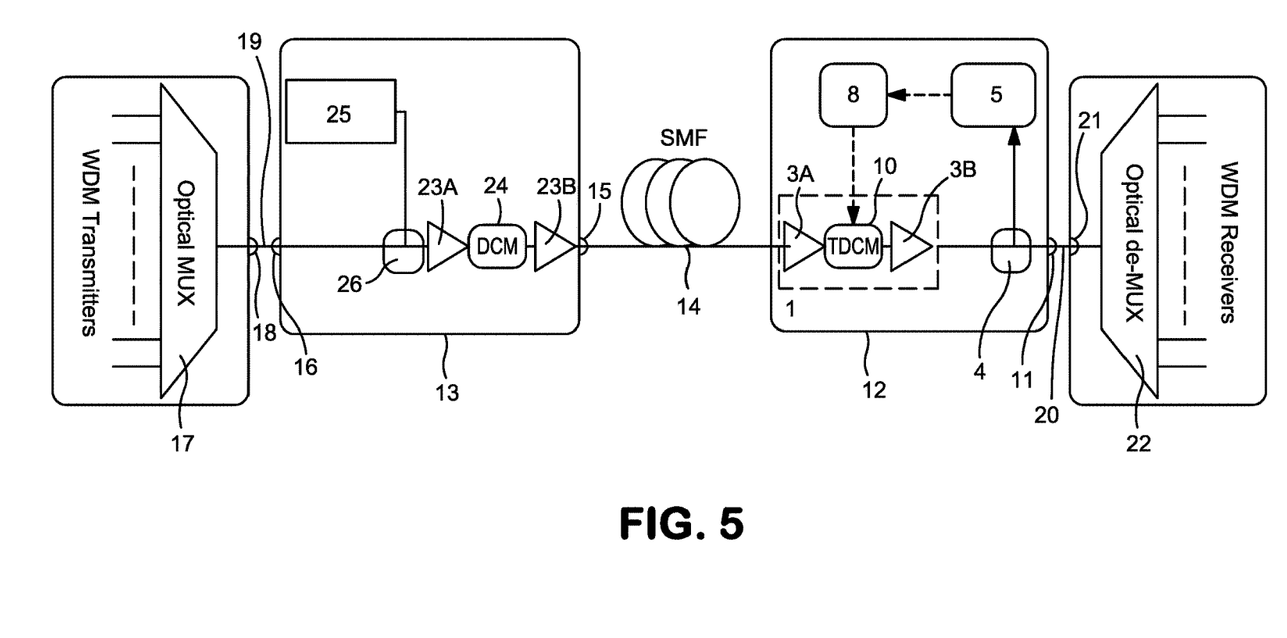
FIG. 5 shows a further possible exemplary embodiment of a chromatic dispersion compensation apparatus according to the first aspect of the present disclosure.

Running the automatic chromatic dispersion estimation and compensation procedure on one or more of the WDM channels instead of using a dedicated probe signal for chromatic estimation and chromatic compensation, has the advantage of significantly simplifying the system structure. Further, it is also possible to provide a probe signal generator 25 as illustrated in the embodiment shown in FIG. 5. In a possible implementation, a laser that is either self-modulated or followed by an external modulator can be used to generate a probe signal. In the illustrated embodiment of FIG. 5, the transmitter line card 13 on the transmitting side comprises a probe signal generation unit 25 adapted to generate a probe signal. The probe signal can comprise a fixed or a tuneable wavelength. The probe signal is supplied to the optical link 14 and can be used for estimation of chromatic dispersion. In the illustrated embodiment, the generated probe signal is supplied to the optical link 14 by an optical coupler, switch or filter 26. To simplify the structure of the probe signal generation unit 25 it is possible to modulate only one quadrature of the optical signal which eliminates the need for an IQ modulator. In this implementation, the modulator can be driven with a binary signal to generate either a NRZ or a DPSK signal or can be similarly driven with a three, four or an eight-level signal to generate a duo-binary, PAM4 or PAM8 signal, respectively. The limitation of the embodiment illustrated in FIG. 5 compared to the embodiment illustrated in FIG. 2 is that the probe signal generation unit 25 may have to use one of the WDM wavelengths. In that case, one of the WDM channels has to be sacrificed for automatic chromatic dispersion compensation.

In a possible embodiment, the chromatic dispersion estimation and compensation procedure can be performed during a start-up phase by setting up the optical link and can stop afterwards. However, in this embodiment, the system is not able to monitor and compensate for variations in the chromatic dispersion of the optical link which might result for instance from changes in the environmental conditions around the optical fiber of the optical link.

The generated probe signal does not carry any data traffic and can be dedicated for chromatic dispersion estimation. The probe signal can have either a fixed or a tuneable wavelength. If the wavelength is fixed then the probe signal can run together with the WDM channels and can keep running for continuous chromatic dispersion estimation throughout the lifetime of the optical link. In contrast, if the wavelength of the probe signal is tuneable for estimation of the chromatic dispersion it is necessary to run the chromatic estimation and/or chromatic compensation procedure before bringing up the WDM channels. For instance, the chromatic dispersion estimation and/or chromatic compensation procedure can be performed only once when bringing up a new optical link and then the probe signal is turned off after completion of the chromatic dispersion estimation and chromatic dispersion compensation. After having accomplished the chromatic dispersion compensation, the WDM channels are then turned on.

FIG. 6 shows a possible exemplary implementation of a coherent receiver which can be used in a chromatic dispersion compensation apparatus 1 according to the first aspect of the present disclosure.

In the illustrated embodiment, the optical coherent receiver 5 comprises a dual-polarization IQ coherent receiver. The dual-polarization IQ coherent receiver comprises polarization beam splitters, PBS, adapted to split apart polarization signal components of the tapped optical signals received from the tapping unit 4 and supplied to the dual-polarization IQ coherent receiver 5 and to split the optical signal generated by a local oscillator LO of the dual-polarization IQ coherent receiver 5. In the illustrated embodiment, the dual-polarization IQ coherent receiver 5 further comprises a first 90 degree hybrid adapted to mix vertical polarization components received from the polarization beam splitters, PBS, to provide a vertical in-phase component and a vertical quadrature component and a second 90 degree hybrid adapted to mix horizontal polarization components received from the polarization beam splitters to provide a horizontal in-phase component and a horizontal quadrature component. The dual-polarization IQ coherent receiver 5 as illustrated in FIG. 6 further comprises photo detectors PD adapted to convert the in-phase components and the quadrature components provided by the two 90 degree hybrids into electrical signals. The electrical signals are converted by the analog converters 6 into digital signal samples supplied to the digital signal processor 8 or written into a local data memory 7 of the chromatic dispersion compensation apparatus 1 as illustrated for instance in FIG. 1.

Figure 7:
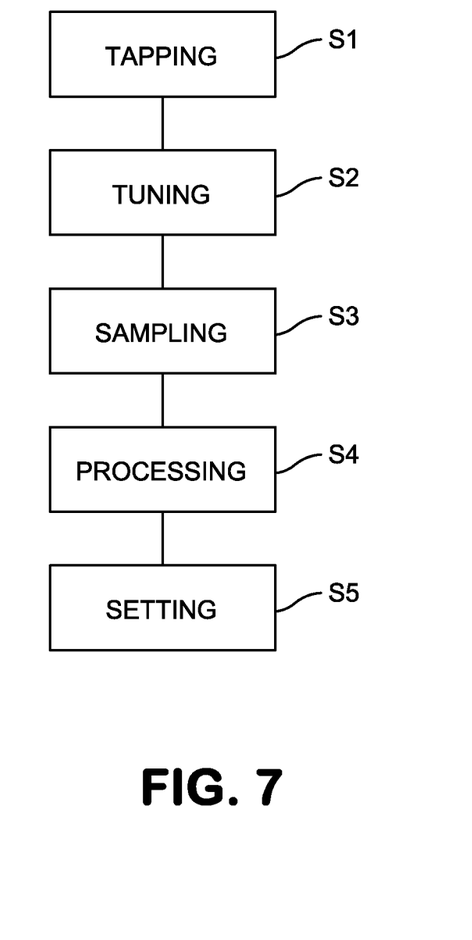
FIG. 7 shows a flowchart illustrating a possible exemplary embodiment of a method for automatic compensation of chromatic dispersion according to the second aspect of the present disclosure.

FIG. 7 shows a flowchart of a possible exemplary embodiment of a method for automatic compensation of chromatic dispersion signals according to the second aspect of the present disclosure. The signals are transmitted via an optical link at predetermined wavelengths of WDM channels within a predetermined wavelength band of the WDM system.

In the illustrated embodiment of FIG. 7, the method comprises several steps. In a first step S1, optical signals received via the optical link at predetermined wavelengths are tapped and supplied as tap signals to an optical coherent receiver such as the optical coherent receiver 5.

In a further step S2, a local oscillator of the optical coherent receiver is tuned to selected WDM channels to generate corresponding analog electrical signals of the different WDM channels.

In a further step S3, the analog electrical signals are sampled by the analog digital converters to provide digital signal samples of the different WDM channels.

In a further step S4, the digital signal samples are processed by a digital signal processor to calculate a residual chromatic dispersion value of the received optical signals.

In a further step S5, a tuneable dispersion compensation module, TDCM, is set to perform an optical compensation of the residual chromatic dispersion, rCD, of the received optical signals depending on the calculated residual chromatic dispersion value of the received optical signals.

The chromatic dispersion compensated by the method as illustrated in FIG. 7 is a residual chromatic dispersion. In a possible implementation, a bulk amount of the chromatic dispersion is compensated by a separate fixed dispersion compensation module.

Figure 8:
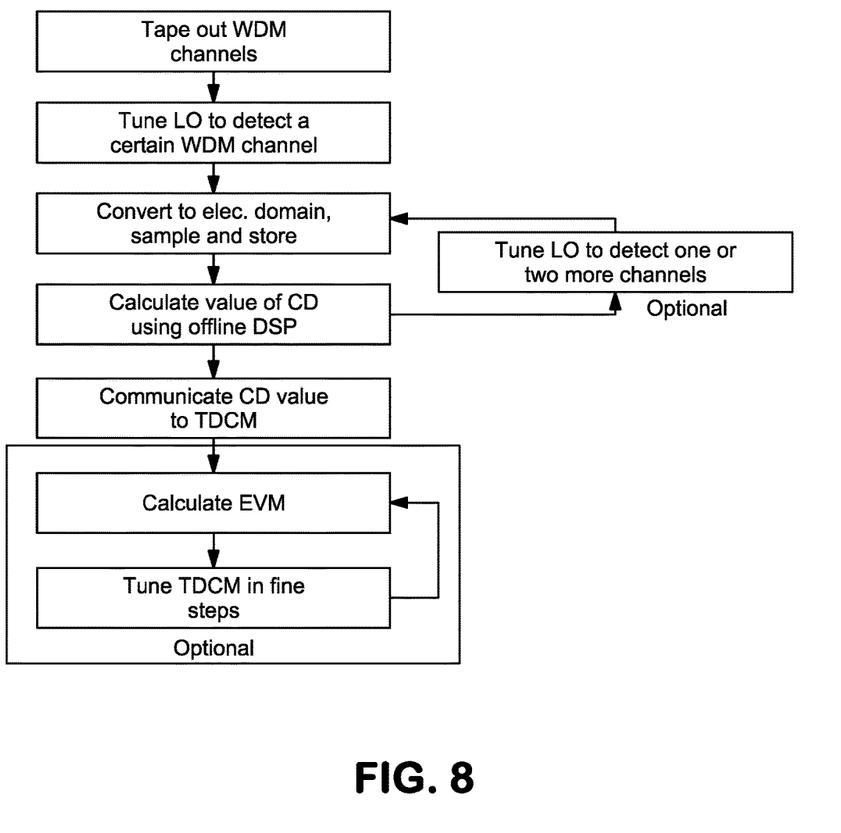
FIG. 8 shows a further flowchart for illustrating a further possible exemplary embodiment of a method for automatic compensation of chromatic dispersion according to the second aspect of the present disclosure.

FIG. 8 shows a flow diagram for illustrating a possible exemplary embodiment of the method according to the second aspect of the present disclosure performed within an automatic dispersion compensation system. As illustrated in FIG. 8, first, the WDM channels are tapped out by a tapping unit. Then, the local oscillator LO of an optical coherent receiver is tuned to detect a predetermined WDM channel. The optical signals are converted to the electrical domain. The analog electrical signals are sampled by an analog digital converter ADC and stored in a local memory for further processing. In a further step, the value of the chromatic dispersion is calculated using an offline digital signal processor DSP. The local oscillator of the optical coherent receiver is tuned to tap additional WDM channels in a possible implementation. As can be seen in FIG. 8, the tuning of the local oscillator LO can be performed in a loop of the procedure. Further, as can be seen in FIG. 8, the chromatic dispersion value calculated by the offline DSP is communicated to the tuneable dispersion compensation module, TDCM.

Further, in the illustrated embodiment, an error vector magnitude, EVM, can be calculated to tune the TDCM in fine steps. This provides the advantage of having the ability to leave a certain level of residual chromatic dispersion to compensate for a chirp which may result from imperfections on the transmitter side.

The invention claimed is:

1. A chromatic dispersion compensation apparatus for automatic compensation of chromatic dispersion, CD, of signals transmitted via an optical link at predetermined wavelengths of WDM channels within a predetermined band of a WDM system, the chromatic dispersion compensation apparatus having a signal input and a signal output, and comprising:
    an amplifier connected to the signal input for amplifying optical signals received at the signal input; and
    a tapping unit coupled to the signal output and receiving the amplified optical signals from the amplifier via an internal signal line coupled to the amplifier, the tapping unit adapted such that the amplified optical signals output by the amplifier can travel through the tapping unit to the signal output and adapted to tap the amplified optical signals received by the chromatic dispersion compensation apparatus at its signal input via the optical link at predetermined wavelengths and adapted to supply the tapped optical signals to an optical coherent receiver adapted to tune its local oscillator to selected WDM channels to generate corresponding analog electrical signals of the different WDM channels which are sampled by an analog digital converter, ADC, to provide digital signal samples of the selected WDM channels processed by a digital signal processor, DSP, of the chromatic dispersion compensation apparatus to calculate an estimate residual chromatic dispersion value of the received optical signals,
    wherein a tuneable dispersion compensation module, TDCM, of the chromatic dispersion compensation apparatus is set to perform an optical compensation of a residual chromatic dispersion, rCD, of the received optical signals depending on the calculated estimate residual chromatic dispersion value of the received optical signals.

2. The chromatic dispersion compensation apparatus according to claim 1, wherein a bulk amount of chromatic dispersion, bCD, is compensated by a fixed dispersion compensation module, DCM, connected in the optical link, upstream of the signal input.

3. The chromatic dispersion compensation apparatus according to claim 1, wherein the residual chromatic dispersion, rCD, of the received optical signals is compensated in two compensation stages comprising a coarse compensation stage and a fine compensation stage;
    wherein in the coarse compensation stage, the digital signal processor, DSP, is used to estimate a coarse value of the residual chromatic dispersion, rCD, communicated to the tuneable dispersion compensation module, TDCM, which performs a compensation of the received optical signals depending on the estimated coarse value of the residual chromatic dispersion; and
    wherein in the fine compensation stage, an error vector magnitude, EVM, of the received optical signals is calculated and used as a metric for fine tuning of the chromatic dispersion setting of the tuneable dispersion compensation module, TDCM.

4. The chromatic dispersion compensation apparatus according to claim 1, wherein the estimate residual chromatic dispersion value of the received optical signals calculated by the digital signal processor, DSP, is communicated to a setting processor adapted to set the tuneable dispersion compensation module, TDCM, according to the communicated estimate residual chromatic dispersion value.

5. The chromatic dispersion compensation apparatus according to claim 1, comprising:
    a probe signal generation unit adapted to generate a probe signal having a fixed or tuneable wavelength; and
    the probe signal being supplied to the optical link and used for estimation of chromatic dispersion, CD.

6. The chromatic dispersion compensation apparatus according to claim 1, wherein the digital samples output by the analog digital converter, ADC, are stored in a memory and processed by the digital signal processor, DSP, in an offline processing mode.

7. The chromatic dispersion compensation apparatus according to claim 1, wherein the tuneable dispersion compensation module, TDCM, is collocated with the tapping unit, the optical coherent receiver, the digital signal processor, DSP, and the setting processor on a receiver line card at a receiver side of the optical link.

8. The chromatic dispersion compensation apparatus according to claim 1, wherein the tuneable dispersion compensation module, TDCM, is located on a transmitter line card at a transmitter side of the optical link and receives the chromatic dispersion compensation setting from a setting processor located on a receiver side via an optical supervisory channel, OSC, through the optical link.

9. The chromatic dispersion compensation apparatus according to claim 1, wherein the tapping unit comprises an optical splitter, an optical switch or an optical filter.

10. The chromatic dispersion compensation apparatus according to claim 1, wherein the tapping unit is connected to an output of an optical preamplifier of a receiver line card or to an output of an optical demultiplexer connected to the output of an optical preamplifier of a receiver line card.

11. The chromatic dispersion compensation apparatus according to claim 1, wherein the optical coherent receiver comprises a dual-polarization IQ coherent receiver.

12. The chromatic dispersion compensation apparatus according to claim 1, wherein the local oscillator of the optical coherent receiver comprises a tuneable laser diode.

13. A method for automatic compensation of chromatic dispersion of signals transmitted via an optical link at predetermined wavelengths of WDM channels within a predetermined band of a WDM system, the method, being carried out by a chromatic dispersion compensation apparatus having a signal input and signal output, comprising:
    amplifying, by an amplifier of the chromatic dispersion compensation apparatus connected to the signal input, optical signals received at the signal input;
    tapping, by a tapping unit coupled to the signal output and receiving the amplified optical signals from the amplifier via an internal signal line coupled to the amplifier, the tapping unit being adapted such that the amplified optical signals output by the amplifier can travel through the tapping unit to the signal output, optical signals received via the optical link at predetermined wavelengths and supplying the tap signals to an optical coherent receiver;
    tuning a local oscillator of the optical coherent receiver to selected WDM channels to generate corresponding analog electrical signals of the different WDM channels;
    sampling the analog electrical signals by an analog digital converter to provide digital signal samples of the different WDM channels;

processing the digital signal samples by a digital signal processor, DSP, to calculate a residual chromatic dispersion value of the received optical signals; and setting a tuneable dispersion compensation module, TDCM, to perform an optical compensation of a residual chromatic dispersion, rCD, of the received optical signals depending on the calculated residual chromatic dispersion value of the received optical signals.

14. The method according to claim 13, wherein a bulk amount of chromatic dispersion, bCD, of the optical link is compensated by a fixed dispersion compensation module, DCM, connected in the optical link upstream of the signal input.

15. The method according to claim 13, wherein the residual chromatic dispersion, rCD, of the received optical signals is compensated in two compensation stages comprising a coarse compensation stage and a fine compensation stage;

wherein in the coarse compensation stage, a dedicated digital signal processor, DSP, is used to estimate a coarse value of the residual chromatic dispersion, rCD, communicated to the tuneable dispersion compensation module, TDCM, which performs a compensation of the received optical signals depending on the estimated coarse value of the residual chromatic dispersion; and wherein in the fine compensation stage, an error vector magnitude, EVM, of the received optical signals is calculated and used as a metric for fine tuning of the chromatic dispersion setting of the tuneable dispersion compensation module, TDCM.

16. The method according to claim 15, wherein a probe signal is generated and used for estimation of chromatic dispersion; and/or wherein at least one signal of a WDM channel is used for estimation of chromatic dispersion.

17. The method according to claim 15, wherein the samples output by the analog digital converter, ADC, are stored in a memory and processed by the digital signal processor, DSP, offline and/or wherein the optical compensation of the residual chromatic dispersion, rCD, of the received optical signals is performed continuously in the background throughout a lifetime of the optical link.

* * * * *